US005598412A
United States Patent [19]
Griffith et al.

[11] Patent Number: 5,598,412
[45] Date of Patent: Jan. 28, 1997

[54] SWITCHING ARRANGEMENT FOR WIRELESS TERMINALS CONNECTED TO A SWITCH VIA A DIGITAL PROTOCOL CHANNEL

[75] Inventors: Gary L. Griffith, Arvada; Michael L. Nienaber, Thornton; Norman W. Petty, Boulder, all of Colo.

[73] Assignee: Lucent Technologies Inc., Murray Hill, N.J.

[21] Appl. No.: 547,643

[22] Filed: Oct. 24, 1995

Related U.S. Application Data

[63] Continuation of Ser. No. 176,183, Jan. 3, 1994, abandoned.
[51] Int. Cl.[6] .............................. H04L 12/50; H04L 12/56
[52] U.S. Cl. .............................. 370/352; 379/60; 370/524
[58] Field of Search ................................ 370/58.1, 58.2, 370/58.3, 60, 60.1, 110.1, 95.3, 94.1, 95.1, 85.2, 85.13; 379/59, 58, 60; 340/825.03

[56] References Cited

U.S. PATENT DOCUMENTS

| | | | |
|---|---|---|---|
| 4,549,291 | 10/1985 | Renoulin | 370/60.1 |
| 4,680,786 | 7/1987 | Baker et al. | 379/60 |
| 4,769,833 | 9/1988 | Farleigh et al. | 370/60.1 |
| 4,837,800 | 6/1989 | Freeburg et al. | 379/59 |
| 4,879,740 | 11/1989 | Nagashima et al. | 379/60 |
| 5,128,981 | 7/1992 | Tsukamoto et al. | 379/60 |
| 5,208,806 | 5/1993 | Hasegawa | 370/60.1 |
| 5,297,190 | 3/1994 | Ito | 379/58 |
| 5,319,699 | 6/1994 | Kerihuel et al. | 370/110.1 |
| 5,323,446 | 6/1994 | Kojima et al. | 370/95.3 |
| 5,325,419 | 6/1994 | Connolly | 379/59 |
| 5,329,572 | 7/1994 | Martens | 370/60.1 |

FOREIGN PATENT DOCUMENTS

| | | |
|---|---|---|
| 443465 | 6/1991 | European Pat. Off. ......... H04M 3/42 |
| 930044 | 4/1993 | Germany . |
| 04170825 | 6/1992 | Japan . |
| WO91/18483 | 11/1991 | WIPO . |

OTHER PUBLICATIONS

Eleventh International Conference on Computer Communications, Towards a New World in Computer Communication, 28 Sep.–2 Oct. 1992, O. Freitag et al., "Strategies for the Implementation of Dect Systems in ISPBX Networks," pp. 617–622.

IEEE Journal on Selected Area in Comm., Aug. 11, 1993, A. D. Malyan et al., "Network Architecture and Signaling for Wireless Personal Communications," pp. 830–841.

Primary Examiner—Benedict V. Safourek
Assistant Examiner—Ricky Q. Ngo
Attorney, Agent, or Firm—David Volejnicek; Henry T. Brendzel

[57] ABSTRACT

A digital port includes a passive bus and, at least, the registration and call transfer features associated with a switch to provide cellular wireless capability. The passive bus allows a base station to be connected to the channel and thereby interface a plurality of wireless terminals to the switch. While only some of the wireless terminals in the neighborhood of a base station can be active concurrently (as is the case in all wireless systems) by way of a digital communication channel that is included in the passive bus, the switch can register and, hence, keep track of, a larger number of wireless terminals that are present in the base station's neighborhood. The passive bus also includes at least one circuit switched channel to allow communication with one or more wired or wireless terminals.

27 Claims, 4 Drawing Sheets

SWITCHING ARRANGEMENT FOR WIRELESS TERMINALS CONNECTED TO A SWITCH VIA A DIGITAL PROTOCOL CHANNEL

This application is a continuation of application Ser. No. 08/176,183, filed on Jan. 3, 1994, now abandoned.

BACKGROUND OF THE INVENTION

This invention relates to switch arrangements for both wired and wireless terminals.

Wireless telephones are becoming ubiquitous. Presently, they are used in specialized wireless networks. In the cellular network, cellular telephones communicate with base stations (which form the centers of cells) and the base stations relay the communications to the more expansive "landline" switching networks. Typically, the wireless networks are at least in part geographically co-extensive with the landline networks but other than the interface points, they do not co-mingle.

It is desirable, of course, to create an arrangement in which the two networks are effectively merged. Viewed differently, it would be beneficial to augment some of the apparatus in the conventional landline networks, for example, PBXs and central office switches, and thereby allow them to interact directly with wireless terminals. Of course, since such systems would be required to concurrently handle both wireless and wired terminals, it would appear that such a system is qualitatively different from conventional cellular telephone systems and from conventional telephone systems.

A number of manufacturers have attempted to fulfill this need. Northern Telecom, for example, has designed a system (commercially known as the "Companion" system, with a few trial systems sold in the U.S.) that allows both wired and wireless connections to a switching machine. The wireless capability is achieved by including a base station that interacts with (at most two simultaneous) wireless terminals. The base station is connected to a controller through a single twisted pair, and the controller is connected to a conventional switch through at most six analog lines. Wired terminals may be connected to the controller through twisted pairs.

As with systems offered by other suppliers, much of what happens within the "Companion" system is considered proprietary by Northern Telecom and is therefore unknown to the public. What is known, however, is that whatever tracking or polling (if any) of the wireless terminals is carried out, and whatever hand-off capabilities are present in the system, they are implemented in and by the controller. The switch does not participate in these processes. Also, the controller interfaces with the switch only through analog lines, and therefore, all of the digital features available in the switch are lost to the terminals that are connected to the controller.

Clearly, it would be beneficial to have an arrangement where no features are lost. It would be also beneficial to design a system, architecture, and approach that can be employed with adjuncts (as in the controller of the "Companion" system) and retrofitted into existing switch arrangements, allowing them to service both wired and wireless terminals i.e., wireless telephones, wireless computers, wireless fax machines, etc. It would be even more advantageous if such a system could be incorporated into the switch itself (obviating the need for an adjunct) and yet be able to handle both wired and wireless terminals.

SUMMARY OF THE INVENTION

The desired benefits are achieved with a switch arrangement having a digital port with a passive bus format and, at least, the registration and call transfer features. The passive bus allows a base station to be connected to the channel and thereby interface a plurality of wireless terminals to the switch. While only some of the wireless terminals in the neighborhood of a base station can be active concurrently (as is the case in all wireless systems), by way of the digital communication channel that is included in the passive bus the switch can register, and hence keep track of, a larger number of wireless terminals that are present in the base station's neighborhood.

The digital protocol channel can, for example, have the ISDN format, providing one D channel and 2 B channels, or 1 D channel and 23 B channels. The D channel is the data channel and it primarily is devoted to communicating control information between the switch on one side and the base station with all its "dependents" on the other side. The base station "dependents" are the wired terminals that may be connected to the base station, the wireless terminals that are associated with the base station but are inactive (at least vis-a-vis the base station) and the wireless terminals that are communicating information through the base station via one or more of the information channels. In the ISDN environment those information channels are circuit switched channels.

DETAILED DESCRIPTION

Figure 1:
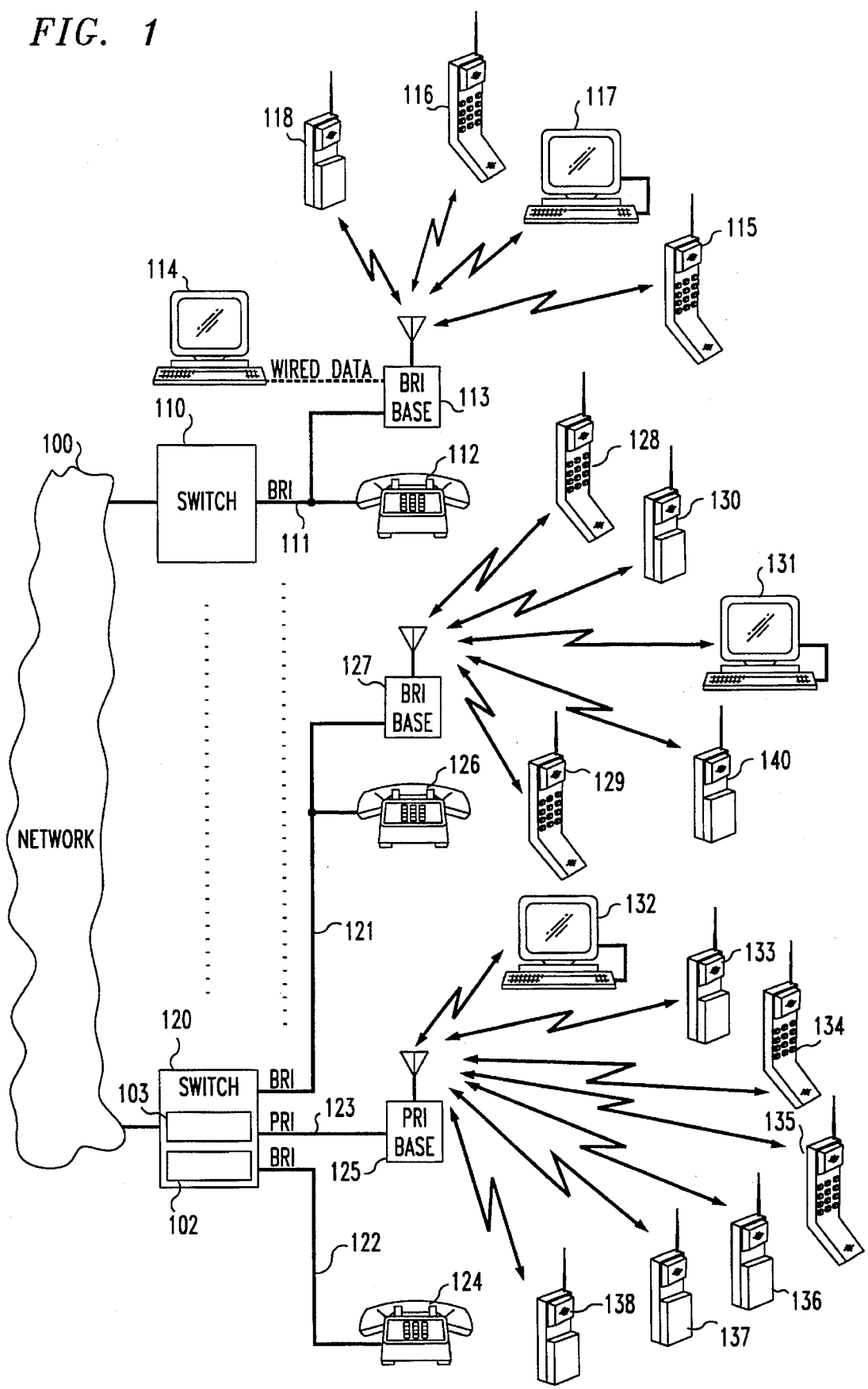
FIG. 1 illustrates an arrangement for servicing both wired and wireless terminals from common switches.

FIG. 1 presents a block diagram of a system that employs the principles of this invention. Network 100 is a telecommunications network with switches 110 and 120, which may be digital switches that provide ISDN line interfaces. These may be BRI (Basic Rate Interface) line interfaces as well as PRI (Primary Rate Interface) line interfaces. Such switches, be it PBXs or central office switches, are well known in the art.

As an aside, a BRI interface offers one D channel and 2 B channels, whereas a PRI interface offers one D channel and 23 B channels (in North America). The BRI signal format is depicted with more particularity in FIG. 2, which shows a frame that is 48 bits long. The frame includes D channel bits in bit positions 12, 25, 36, and 47; B1 channel bits in bit positions 3–10 and 27–34; B2 channel bits in bit positions 16–23 and 38–45; and maintenance and framing bits in all other bit positions. The B channel and D channel bits can be collected over a multiple number of frames, yielding effectively two 64Kbit B channels for each 16Kbit D channel. The BRI interface allows the D channel to keep track of eight connected terminals, although only two can be active at any one time (over the two B channels).

Returning to FIG. 1, switch 110 illustratively has a BRI line 111 connected to a telephone terminal 112 and to a BRI wireless base station 113. BRI line 111 could have been connected solely to base station 113 or solely to telephone terminal 112. The ability to connect to both base 113 and terminal 112 forms one feature of the FIG. 1 system, which is described in greater detail below. Wireless base 113 has the capacity to handle wired terminals and wireless terminals. The wired terminal capability is illustrated by the connection of computer 114, and the wireless capability is illustrated via the communication with wireless telephones 115, 116 and 118, and wireless computer 117. It may be observed that wireless telephone 118 is drawn differently from wireless telephones 115 and 116. The latter telephones are drawn "open" to designate that these wireless telephones are in an active communication state with the base, and a call is in progress. Wireless telephone 118 is drawn "closed" to indicate that the wireless telephone is inactive, and a call is not in progress.

Switch 120 may be identical to switch 110. It is shown to include BRI lines 121 and 122 and PRI line 123. Line 122 is connected solely to telephone terminal 124, line 123 is connected to PRI base station 125, and BRI line 121 is connected to telephone terminal 126 and to BRI base station 127.

Base station 127 is communicating with wireless telephones 128 and 129 which are active, with wireless telephones 130 and 140 which are inactive, and with wireless computer 131. Base station 125 is communicating with wireless computer 132 and with wireless telephones 133–138. Since the BRI base stations carry 2 B channels, it is contemplated that two terminals will be allowed to be active at any one time. In PRI base stations, 23 terminals will be allowed to be active at any one time.

At this point it may be useful to digress a bit from the structure of the FIG. 1 arrangement and discuss wireless transmission per se.

First, it is contemplated that the base stations will operate in a manner similar to that of cellular base stations. Specifically, it is contemplated that the base stations will employ a communication frequencies schema not unlike that of cellular systems, coupled with transmission power arrangements that limit the cell sizes appropriately (so as not to co-mingle the signals of two base stations that use the same frequencies). This allows the wireless terminals to listen to all relevant frequencies simultaneously, determine the frequencies that have the strongest signal, and thus approximate their proximity to the various base stations.

As for the general protocol related to communication over the air, consideration must be given to the fact that the "over the air" channel is somewhat impaired (it suffers from various maladies, such as fading and collisions between the signals of different wireless terminals). Solutions to these problems are well known in the art, however, (e.g., ALOHA) and do not form a part of this invention.

Figure 2:
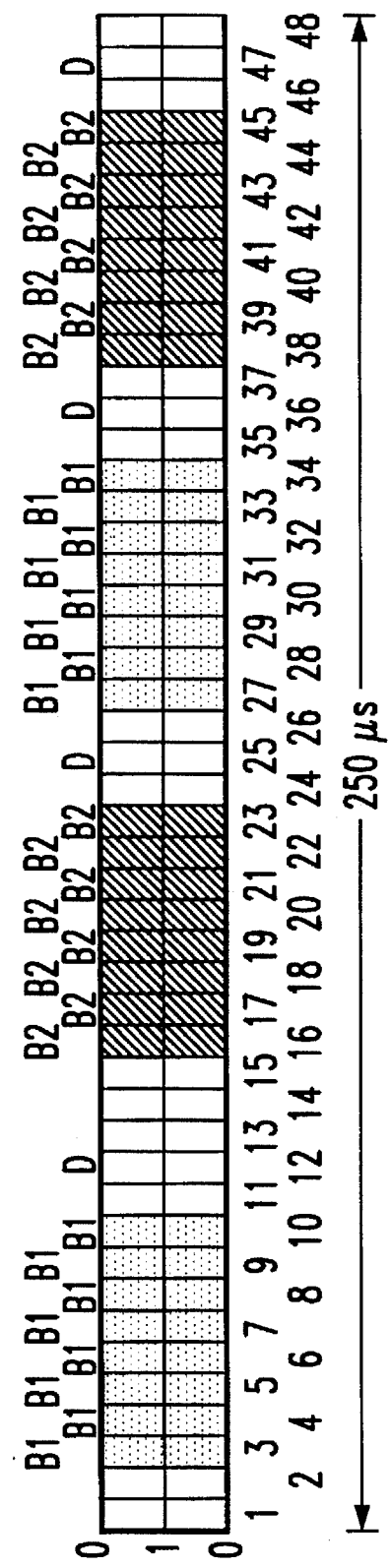
FIG. 2 presents a signal format.

Over and above the protocols related to the vagaries of wireless communication, we contemplate employing a transmission format that is based on time division multiplexing (TDM). For convenience, all base stations are synchronized to each other as described, for example, in a co-pending application titled "Arrangement for Synchronizing A Plurality of Base Stations" which was filed on Jul. 1, 1993, and bears the Ser. No. 08/086678, and in U.S. Pat. No. 5,195,090, issued on Mar. 16, 1993. Although not required, it is also convenient to follow the ISDN format generally (if not exactly) for the wireless communication. That is, accepting to that a protocol is implemented which is responsive to the need to communicate in an error-free way over the air, the format of the signals transmitted and received by the base stations (and the wireless terminals) may be as shown in FIG. 2.

In operation, the B channels bits and the D channel bits are collected over time in appropriate buffers (in the base stations and the wireless terminals), and with the aid of the maintenance and framing bits, B channels and D channel data streams are developed. The time for each bit shown in FIG. 2 may be divided into a transmit portion and a receive portion. Alternatively, every other frame of data can be allocated to transmission by the base station, with the other frames allocated to reception by the base station. Again, the particular transmission interface is a design choice and is unimportant to this invention. Suffice it to say that both the base stations and the terminals can identify the data of the two B channels and the data of the D channel.

Moreover, since the D channel of the standard BRI interface can keep track of eight terminals, the "over the air" wireless protocol for the BRI base stations is arranged to similarly keep track of any eight wireless terminals over the D channel. The circuits within the wireless terminals and within the base stations are arranged to accumulate D channel bits in a buffer and deliver the bits to the appropriate processing circuits in bursts, or packets, where the number of bits in each packet is sufficient to convey the needed, processable, information.

Since the specific "over the air" transmission method is not material, to assist in understanding the description herein the following assumes that the D channel data is communicated "over the air" in packets, e.g. having 32 bits each, alternating in direction, and time multiplexed with B channels data and maintenance and framing data. Each pair of such packets (one in each direction) belongs to a different one of eight subchannels (in a BRI base station), and each subchannel keeps track of a different wireless terminal. Of course, a PRI base station supports 23 subchannels.

TRACKING

One capability that is incorporated in the arrangement of FIG. 1 and which is deemed necessary for the proper operation of multi-cell wireless systems, is the ability to track movement of the wireless terminals from cell to cell. (As indicated above, in the context of the FIG. 1 system, each base station defines a cell.) Indeed, the arrangement of FIG. 1 is able to track a wireless terminal as it roams from the neighborhood of one base station of a switch to the neighborhood of another base station of the same switch. Moreover, as will be shown below, the ability exists for tracking a wireless terminal even as it roams from the base station of one switch to the base station of another switch. This tracking can be under control of the wireless terminals or under control of the switches. (In the context discussed herein, and in connection with tracking, "control" relates to the initiation of the processes that result in tracking of the roaming wireless terminals.)

A unique aspect of the tracking process disclosed herein is that the tracking is accomplished through use of a feature, or capability, which is already available in present day switches and which is used in connection with the provision of another service to wired terminals. This is the "registration" feature (illustrated by block 102 in switch 120).

The "registration" feature—which is a feature for which there are well known implementations—is associated with specially designed telephones and corresponding software-controlled capability in the switches, such as the DEFINITY (Registered Trademark of AT&T) PBX and the No. 5 ESS switch (Registered Trademark of AT&T). These telephones are designed to activate themselves whenever they are initially connected to a port of the switch (e.g. plugged into a modular plug that is commonly found in the home or an office). When so activated, the telephones send unique identification information to the switch. This information may comprise the designated phone number or extension number of the telephone terminal, the type of terminal it is, etc. The software-controlled feature in the switch (e.g. 120) is designed to accept this information and to "register", or associate, the extension number and the type, identity or characteristics of the terminal with the line appearance within the switch. This allows the switch to know what features to provide to that particular line appearance, as well as what calls to forward to the line appearance. To the user of the wired telephone terminal, it appears that the system allows movement of telephone line extensions simply by moving the physical telephone, with no need to administer the system in any manner; a very handy feature indeed, particularly for a PBX of a dynamic business enterprise.

Strictly speaking, the registration, or identification, process as described above is terminal-activated, because it occurs when the terminal is initially connected to the switch. It is also possible for the registration to be switch-activated. Such an approach is achieved when the switch interrogates the terminals connected to it, for example at regular intervals, and through the message received from the wireless terminals by way of a response, verifies that whatever the switch believes to be present and connected to it, indeed is.

What follows is one method for employing the registration feature to track wireless terminals.

In operation, each base station in the FIG. 1 arrangement repetitively transmits (over the air) a hailing packet which contains an ID field that identifies the base station, a destination field that identifies the wireless terminal with which the base station is attempting to communicate, and a data field. The destination field can be blank, of course, indicating that the subchannel to which this packet belongs is empty, or unoccupied.

Wireless terminals in the neighborhood of a base station are either already registered with the base station, or are not yet registered with the base station. Those that are registered, whether active (e.g., terminal 116) or inactive (e.g., terminal 118), listen to the transmitted hailing packets and capture the packet that is addressed to them. The wireless terminals respond to the data contained in the packet (e.g. carry out a requested action), and transmit a response packet back. Similar to a hailing packet, the response packet carries the base station ID, the wireless ID, and data. For example, the response packet of an inactive, dormant, wireless terminal may simply have no information in the data field. Its wireless ID is all that the base station needs to maintain registration.

A wireless terminal that is not yet registered but finds itself in the neighborhood of the base station is not hailed by "name". However, should the base station transmit some unoccupied hailing packets, the terminal recognizes that it is receiving such packets and, when the received signal is strong enough, the wireless terminal randomly selects an unoccupied packet and responds with a packet that contains its wireless ID. If a collision occurs (because another unregistered wireless terminal happened to choose the same packet to register with) then the base station simply fails to register the terminal and another unoccupied packet must be selected. Otherwise, the base station assigns the subchannel selected by the wireless terminal to that terminal and henceforth hails that wireless terminal over that subchannel.

When a wireless terminal fails to respond to a preselected number of hailing packets that are specifically addressed to it, the base station assumes that the wireless terminal has left its neighborhood and makes that subchannel unoccupied.

As an aside, the measurement of signal strength can also be made at the base stations rather than at the wireless terminals. A terminal can then respond to all unoccupied hailing packets—from whatever base station they originate—and allow a base station which chooses to register the terminal (because its signal is strong enough) to hail the terminal by "name" (its wireless ID). Thereafter, the wireless terminal would respond only to hailing packets that are addressed to it by "name".

The above describes the "over the air" tracking. This tracking can be initiated by the base units, or by the switch itself. Regardless of which unit initiates the tracking it does not necessarily follow that every time a wireless terminal responds to a hailing packet, a signal must be sent from the base station to the switch. Rather, it is generally acceptable for the base station to relay the identification information to the switch only when there is a change in conditions that the switch needs to be made aware of, such as when a new wireless terminal identifies itself to be in the neighborhood of, and therefore associated with, the base station; or, conversely, when a wireless terminal that used to be associated with the base fails to respond. This saves the switch from activating the "registration" process (block 102) unnecessarily, but it does impose a slight burden on the base station. This burden can be carried quite easily, however, by simply including a memory in the base stations that keeps track of the terminals that are associated, or registered, with the base station.

The paragraph above impliedly also assigns a translation function to the base stations to the extent that the format of data in the "over the air" transmission is not identical to the format of data that the switch expects. Indeed, a designer of a FIG. 1 embodiment might include a specific translation module to allow the base station the design flexibility to respond to wireless terminals of different manufacturers and somewhat different, but yet compatible, designs. Such translating can be accomplished with a simple reformatting process that can be programmed into a micro-processor. Nevertheless, it should be noted that such translating is not a requirement of the FIG. 1 arrangement. Indeed, other advantages accrue if the wireless terminals provide an identification string that is identical in format to that expected by the switch. A mix is also possible. That is, the base stations of FIG. 1 can translate the messages of only those terminals that need such translating.

TRACKING FROM CELL TO CELL BETWEEN SWITCHES

Needless to say, it would be advantageous to be able to track the movement of wireless terminals not only between base stations connected to one switch (e.g. from base station 127 to base station 125), but also to track such movement between base stations of different switches. Such tracking may be effected through broadcasting among the switches, through a master database, through directed transmission from one switch to another switch, or through control signals sent to the switches by the wireless terminals.

For illustrative purposes the following describes the broadcasting approach. One may consider, for example, that each wireless terminal has a "home" switch to which the wireless terminal is assigned. In a well-administered arrangement, the wireless terminal would most often be found in the neighborhood of the "home" base station. When a call is placed to a wireless terminal, it normally goes to the home switch of that wireless terminal. As long as the wireless terminal is within the home switch's neighborhood (probably the archetypical condition when the switch is a PBX of a business enterprise and the wireless terminal belongs to an employee of that business), the switch already knows with which base station the wireless terminal is associated, and directs incoming calls to that base station. The base station alerts the wireless terminal, the wireless terminal goes "off hook", and a connection (e.g. over one of the B channels) is established through appropriate signaling over the D channel. In effect, all signaling is carried over the D channel. This includes setup information, call take-down information, feature activation information, and others. Even digital data as such can be communicated over the D channel.

However, when the called wireless terminal is not within the neighborhood of its "home" switch, then the call to that wireless terminal cannot be completed, unless the "home" switch or the network (100) knows where the wireless terminal is. More precisely, the need is know to which network 100 switch should the call be forwarded.

In the broadcast mode, whenever a switch (e.g., switch 110) recognizes the presence of a wireless terminal (e.g., terminal 130) whose home switch is other than itself, it broadcasts the identity of the wireless terminal over network 100. (This assumes that the information provided by the wireless terminal does not identify its home switch.) A switch in the network (e.g., switch 120) recognizes that wireless terminal as "its own", communicates that information to the broadcasting switch, and the latter then knows the identity of the switch to which calls are to be directed. As an aside, the directing of calls (destined to wireless terminal 130, in the above example) can be by way of relaying the call from the home switch (switch 110) to the other switch (switch 120), or it can be by way of informing network 100 that calls (to terminal 130) are to be routed directly to the switch that can communicate with the called wireless terminal. This relaying process (sometimes referred to as "call forwarding") is well known in the art.

Alternatively, the wireless ID transmitted by each wireless terminal may include the identity of the home switch. In such embodiments no broadcasting is necessary and the switch that receives an identification string which specifies a home switch other that itself will immediately notify the proper home switch (or network 100) of the wireless terminal's location.

CALL HAND-OFF

It goes almost without saying that the arrangement of FIG. 1 needs a means for handing off active calls from one base station to another base station. The hand-off is necessary when the wireless terminal that participates in the active call moves away from the neighborhood of one base station and into the neighborhood of another base station.

Of course, such movement is hardly ever completely sudden, so the expectation is that there will always be a period of time where the signal strength between the wireless terminal and its current associated base station deteriorates (that base station being the Losing base station) while the call is still serviced by that base station. Hopefully, while the connection to the Losing base station deteriorates but is not yet unusable, the signal strength between the wireless terminal and some other base station (the Acquiring base station) increases, and the call can be handed off to the Acquiring base station. Otherwise, the call will eventually be lost.

It is an aspect of the FIG. 1 arrangement that the call hand-off process for wireless terminals is effected in the switches (e.g., 110 and 120) with features, or capabilities, that are otherwise used to provide service features and capabilities to wired terminals connected to the switches. These features may be used "as is" or slightly modified. Indeed, a number of such features can alternatively be used to effect hand-off. These are "conference", "call transfer" and "bridging", and they are depicted in FIG. 1 by block 103.

Bridging is the ability to have a call that is destined to a terminal associated with one number, appear at that terminal and at a number of another terminals. The typical application of bridging is secretarial coverage for an individual's telephone. The briding setup is preset. That is, it is administered into the system a priori. The actual bridging of a particular call can be initiated at will at the individual's phone, or at the secretary's phone, at any time (even when a call is in progress), simply by delivering an appropriate control message to the switch.

This standard feature, which is used in switches in connection with wired terminals, is ideal for effecting hand-off between two base stations connected to a switch, if the administration of the bridging can be made flexible enough to be created "on the fly". The reason bridging would be ideal is because either party to the bridge can pickup to initiate a call and as long as either party is on, the call is not terminated. The hand-off can be under control of the base stations, or it can be under control of the wireless terminals.

When base station (or wireless terminal) control is used, the Acquiring base recognizes the fact that the arriving wireless telephone is in the midst of an active call and also recognizes when the signal quality is sufficiently good to sustain reliable communication. At that point the wireless terminal sends the Acquiring base a conference request to the switch and the switch responds by administering the system appropriately and by bridging the active call through the Acquiring base station. At a somewhat later time the wireless terminal sends the Losing base a request to transfer to call to the Acquiring base, and the call to the Losing base is dropped.

In some applications it may be useful to fail to discontinue the bridging because it may be expected that the wireless telephone will return to its normal neighborhood within a short time and it would, therefore, be wasteful of resources to switch the wireless terminal back and forth between base stations. Even in situations where a drop off is recommended, it may be useful to set the low level threshold fairly low.

As indicated above, the critical problem with the current embodiments of the bridging feature is that it must be pre-administered. Another problem is that currently available switches cannot bridge telephone terminals of other switches. Hence, with current embodiments of the bridging feature the more appropriate features to use are the conventional "conference" and/or "transfer" features.

The "conference" feature contemplates bridging a call to a user-specified number. It differs from the "bridging" feature in that it is not pre-administered. A very close "cousin" of conferencing is the "transfer" feature where a call is terminated at the number from which the call is to be transferred, and connected to a specified number.

Much like the process described in connection with bridging, the hand-off process that uses the conferencing feature is effected by first connecting the call to the number of the Acquiring base, and then transferring the call entirely to that number and away from the Losing base. In other words, the operation of establishing a connection with the Acquiring base and dropping the active connection with the Losing base parallels the operation employed in connection with the bridging feature.

It may be noted that if the "transfer" feature were capable of being honored in an essentially instantaneous manner, it would not be necessary to use the "conference" feature. The latter is used, however, because present systems implement the transfer feature by first disconnecting the call from the originating party (the Losing base) and then connecting the call to the transferred party (the Acquiring base). That, of course, creates a discernible gap in transmission that is not desirable. Conferencing eliminates such gaps. Of course, if one is willing to accept such a gap, the "transfer" feature can be used without resort to the "conferencing" feature.

It may be noted that both the "conference" and "transfer" features are not limited to within a particular switch. A call can be conferenced with, or transferred to, a different PBX or a different central offices.

In connection with use of the "conference" feature "as is", it should be remembered that the present arrangement anticipates the conference button to be pushed (sending a command to the switch); a dial tone to be sent to the switch and in response thereto digits are received at the switch; and finally the conference button pushed again. This sequence can easily be built into the base stations, allowing the conventional "conference" feature to remain unmodified. Alternatively, the conference feature can be modified slightly to operate for both a wired terminals' conference request and a wireless terminals' hand-off request. For example, the conference feature software can be modified to the following logic "if the dial digits signals follow the initial conference command in less than 10 msec, then assume that it is a wireless terminal's hand-off request and don't wait for a second conference command".

MULTIPLE APPEARANCES

The above-described approach for handling "hand-off" works quite well. However, there is an administrative issue that is associated with the described approach. That issue centers on the fact that particular information must be given to the switches to specify the logical port to which a call is to be transferred. That is, in a typical wired terminal application, a call transfer is effected by the switch being told something akin to "transfer this call to extension 3456". In a BRI environment, the switch would accept the designation "extension 3456", translate it to a specific one of the two B channels of a particular ISDN switch port, and make the connection.

In the schema described above, however, the wireless terminal registers itself with the base unit by providing it the terminal's wireless ID—which effectively is the terminal's phone number. The switch, at this point has two appearances of the terminal's phone number in it database: one corresponding to the base station that is transferring the call, and the other corresponding to the base station to which the call is being transferred.

A similar issue arises even when a call is not being transferred. Since there is a finite time during which a wireless terminal is registered with more than one base station, the question must be addressed as to which base station would an incoming call be directed.

One solution is to have each wireless terminal possess two IDs: a primary wireless ID, and a secondary wireless ID that is an alias of the primary ID. When the wireless terminal is already in contact with one base station using one of its numbers, it can flip to the other number when contact is made with a second base station. Should the wireless terminal's movement suggest that the first or the second base station should be dropped in favor of a third base station, the wireless terminal can reuse the number employed with the dropped base station.

In this approach it possible that the secondary wireless ID will be the only registered ID when a call comes it into the network. That presents no problem because the system can be told initially that the ID used is the secondary ID, and the table of aliases could be consulted to perform the necessary translation. That is, the requested ID is not found in the system, but an ID that is an alias of the requested ID is found to be associated with a particular base station. Hence, the call is directed to the base station.

THE PASSIVE BUS

Some aspects of the connection of base stations to the switch have been already disclosed above, but there are two aspects that, perhaps, should be highlighted. One is that the connection is identical in kind to connections made by other (wired) terminals of the switch, such as telephone terminals 112, 126 and 124 in FIG. 1. The other is that when such a connection is made in accordance with the ISDN protocol, all of the features and capabilities that are afforded by the ISDN protocol are available to the base station and, through the base station (with possible translation), to the wireless terminals. ISDN connections belong, for purposes of this disclosure, to a class of connections that is called multipoint, or "passive bus" connections.

A salient aspect of such connections is the ability to simulatneously carry more than one communication channel on the bus. In a BRI line, for example, connection can be had with eight terminals via the D channel, with two of the terminals being active (i.e. sending and receiving data) via the B channels. Thus, the arrangement of FIG. 1 allows line 111, for example, to be aware of telephone 112 and seven additional wireless terminals that at any moment are associated with base station 113. As depicted, there are four wireless terminals already associated with base station 113; but should terminals 130 and 128, for example, come closer to base 113, then the base station will be able to associate those wireless terminals with itself as well.

The D channel also provides control capabilities other than the ones mentioned above, and all can be employed in connection with the wireless terminals. This includes call setup information, call takedown information, caller ID information, call feature activation information, call switch ID information, registration information (described above), call hand-off information (disclosed above), and others. The D channel also provides packet switched user data delivery capability which allows multiple wired and wireless user data sessions to share the single D channel.

The passive bus connection of a base station to the switch forms another unique aspect of the FIG. 1 arrangement in that, as far as the switch is concerned, all features are offered to wired and wireless terminals with the same signals. No distinction needs to be made in the switch whether a "wired terminal"-command needs to be used or a "wireless terminal"-command needs to be used; and the advantages of such an arrangement to the switches are enormous. No new features need to be provided in the switches simply because wireless terminals are present and they need capabilities that are generally not needed for wired terminals.

RETROFIT THROUGH ADJUNCTS

From the above it follows that if one is to use features and capabilities of a switch that are used for providing service to wired terminals, and employ those features and capabilities to provide service to wireless terminals that are allowed to roam, then at least two features need to be available in the switch: "registration", and "transfer". The registration provides the tracking capability, and the transfer provides the hand-off capability. To allow more than one (or very few) wireless terminals to be associated with a base station, the switch needs to also have a passive bus, or each base station needs to be connected to a multiple number of switch output ports.

Figure 3:
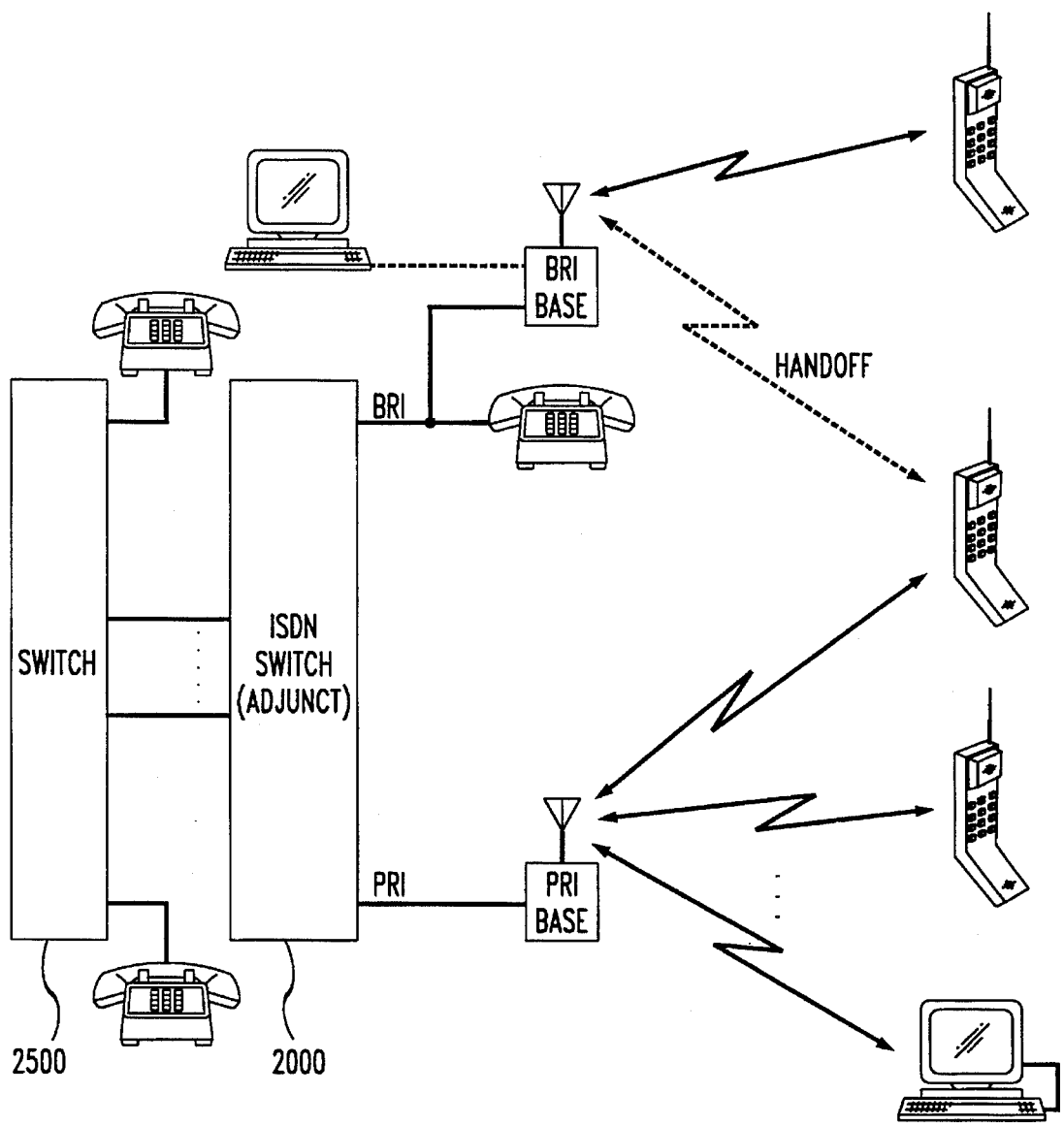
FIG. 3 illustrates the use of an adjunct processor to retrofit a wireless capability in arrangements that include older switches.

Alas, there is a large embedded base of PBXs and central office switches that do not have all of the necessary features. More specifically, whereas most PBXs and central office switches now do offer call transfer and conference features, not many offer the registration feature; and certainly not all PBXs or central office switches have ISDN ports. Yet, it would be desirable to retrofit those switches with wireless capability. This is accomplished, as shown in FIG. 3, with an adjunct switch that is interposed between the terminals (wired and wireless) and the PBX or the central office switch. Adjunct processor 200 handles the tracking and passive bus capabilities and instructs the main switch (250) on where to transfer calls, where to call forward calls, what calls to drop, etc.

BASE STATION BLOCK DIAGRAM

Figure 4:
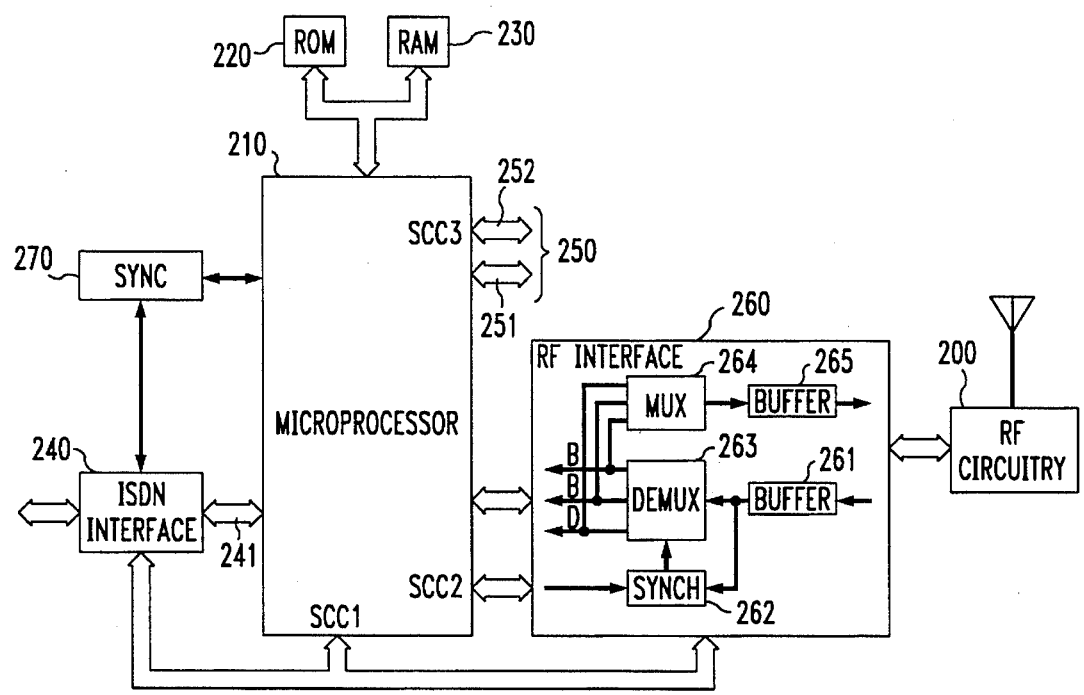
FIG. 4 presents a general block diagram of a base station.

FIG. 4 presents a block diagram that is suitable for the base stations of FIG. 1. It basically comprises RF circuitry section 200 that interfaces with the wireless terminals of FIG. 1, and a digital control and interface section. Section 200 is completely conventional, performing the RF transmission and reception functions. The control and interface section, in turn, is centered about microprocessor 210 with an associated ROM 220 and RAM 230 that are connected to processor 210 via bus 215. ROM 220 contains the program code that controls processor 210, and RAM 230 contains the variables and data buffers used during operation. Microprocessor 210 can be any one of a number of commercial microprocessors, such as the Motorola 68302 microprocessor.

Processor 210 interfaces with the switch of FIG. 1 through ISDN interface 240, as well as with wired terminals (such as terminal 114 in FIG. 1) through data bus 251 and serial communication channel 252 (which make up port 250). Processor 210 interfaces and with wireless section 200 through RF interface block 260.

RF interface 260 performs the specialized functions that are needed for the arrangement of FIG. 1. More specifically, on the receive path, interface 260 buffers the received signal coming from element 200 as appropriate (buffer 261), synchronizes the incoming data to the microprocessor and develops therefrom control signals (synch circuit 262), separates the incoming signals into the B channels and the D channel (demultiplexer 263), and provides control signals to microprocessor 210 to help identify the 8 subchannels on the D channel signal. On the transmit path, interface 260 accepts the B channels and the D channel signals from microprocessor 210, multiplexes the signals as appropriate (multiplexer 264), buffers the signals (buffer 265) and forwards the signals in the appropriate format to block 200. It is possible that, save for some buffering, the elements of RF interface 260 can be implemented within microprocessor 210.

ISDN interface 240 provides the means for providing the exact format expected by a PBX or a central office switch. It is quite likely that interface 240 can be also implemented within microprocessor 210, essentially in toto; but for sake of generality, FIG. 4 includes interface 240. The exact structure of interface 240 is strictly a function of what can be implemented in microprocessor 210 and what are the particular requirements of the PBX or central office processor that one wishes to use. Generally, however, one can anticipate that interface 240 will, at most, contain a small microprocessor, or a number of registers coupled to a small combinatorial circuit. The exact design would be quite conventional and does not form a part of this invention. Sync circuit 270 synchronizes the operations of the microprocessor with that of the switch in the FIG. 1 arrangement and also facilitates a seemless, transparent, ISDN communication between the switch and a wired terminal that may be connected at port 250; as depicted, for example, in FIG. 1 with computer 114.

THE WIRELESS TERMINALS

The wireless terminals of the FIG. 1 arrangement are essentially conventional wireless terminals. They need to communicate with the base stations in an error free way, and to that end they include a preselected, agreed-upon protocol. That, as indicated above, is perfectly conventional. All present-day wireless communication systems have some error detection/correction protocol in place (e.g., retransmission).

In addition, the wireless terminals of FIG. 1 need to communicate in the format chosen by the designer for communicating "over the air" the two B channels, the maintenance and framing bits, and the one D channel—in a BRI base station—. Lastly, the wireless terminals need to listen to all of the possible frequencies of base stations (which conventional wireless terminals already do) and respond to hailing packets as detailed above.

Figure 5:
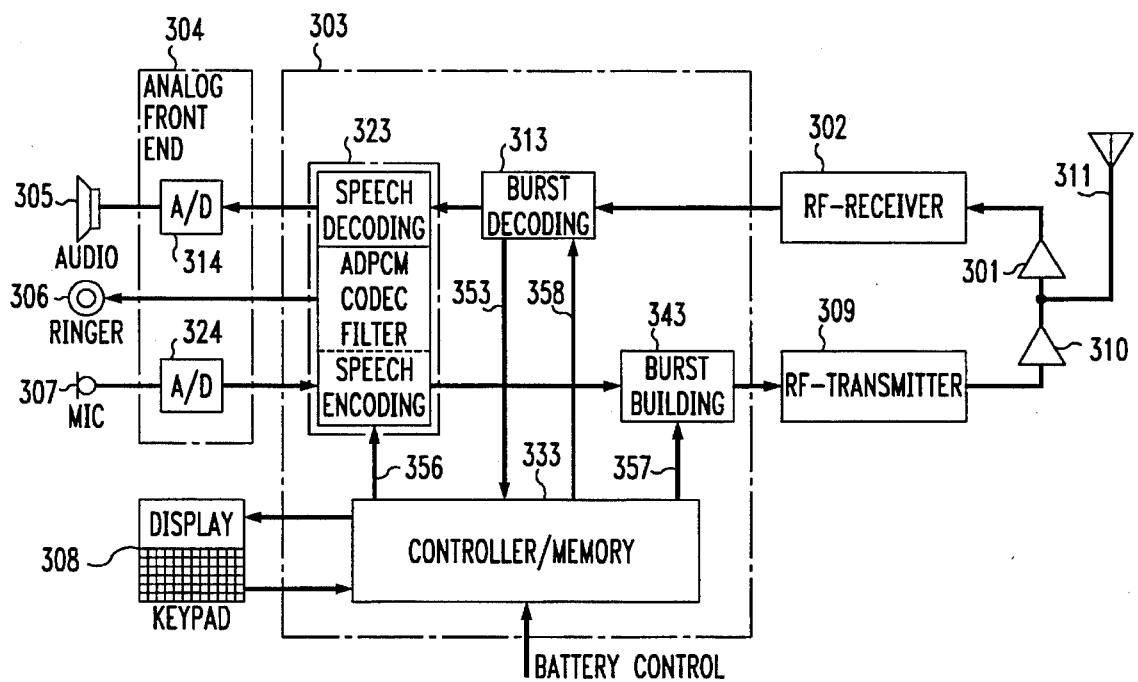
FIG. 5 presents a general block diagram of a wireless terminal.

FIG. 5 presents a block diagram of such a conventional wireless terminal. It is a block diagram (simplified somewhat) of a wireless terminal made by Siemens. The elements in that block diagram may be modified slightly to provide the functionality ascribed above to the wireless units of the FIG. 1 system.

In FIG. 5, incoming digital data signal is received by antenna 310 and is directed to element 302 via RF amplifier 301. The receiver detects the signal, which comes in bursts, decodes the bursts in element 313 and applies the decoded B channel signal to speech circuit 323. Speech circuit 323 develops a digital speech signal and applies it to D/A converter 314 in chip 304. The analog speech signal output of circuit 314 is then applied to speaker 305.

On the return side, speech signals developed in microphone 307 are digitized in A/D converter 324 and the digital signal is applied to element 323. Therein, the speech signal is encoded and applied to burst-building element 343. The burst of digital data is then applied to RF transmitter element 309, which properly modulates the signal, amplifies it in RF amplifier 310, and sends it to antenna 311.

Controller/memory element 333 controls the wireless terminal. It is responsive to the user (through the battery control and the keypad (308), and it communicates with the user through the display (308). It also communicates with elements 313, 323 and 343 through control lines 358, 356 and 357.

In addition to identifying speech signals, burst decoding circuit 313 also identifies the maintenance and framing bits, and the control signals in the incoming data stream and applies those signals to controller/memory element 333 through line 353. Controller 333 captures the D channel control information and operates on the address and data fields, as appropriate. For example, when the D channel data specifies that one of the B channel signals is for the wireless terminal, then controller/memory element 333 activates element 323 (via line 356). Otherwise, element 323 is inactive. Also, if the D channel data specifies that the received packet is merely a hailing packet, then controller/memory element 333 merely directs burst building element 343 to create a response packet.

In summary, conventional wireless terminals with slight software modification to the controller/memory is all that is necessary to realize wireless terminals that are suitable for the FIG. 1 system.

We claim:

1. A switch arrangement comprising:
   a switch including a plurality of ports and means for coupling signals between a pair of said ports, where each of the ports includes at least one circuit switched information channel and at least one packet switched channel, said switch for providing communications features usable by wired terminals to any terminals that are connected to said ports; and
   a wireless base station connected to one of said ports, said wireless base station using only said features usable by wired terminals in its interactions with the switch to provide wireless communications to wireless terminals.

2. The arrangement of claim 1 wherein the packet switched channel of each of said ports supports control information associated with a user of the circuit switched channel of the port.

3. The arrangement of claim 1 wherein the packet switched channel of each of said ports carries call setup information.

4. The arrangement of claim 1 wherein the packet switched channel of each of said ports carries call take-down information.

5. The arrangement of claim 1 wherein the packet switched channel of each of said ports carries call hand-off information.

6. The arrangement of claim 1 wherein the packet switched channel of each of said ports carries base station ID information.

7. The arrangement of claim 1 wherein the packet switched channel of each of said ports carries wireless ID information.

8. The arrangement of claim 1 wherein the packet switched channel of each of said ports carries call feature activation information.

9. The arrangement of claim 1 wherein the packet switched channel of each of said ports carries switch ID information.

10. The arrangement of claim 1 wherein the packet switched channel of each of said ports carries user data.

11. The arrangement of claim 1 wherein the signal format between the switch and the wireless base station is the ISDN signal format.

12. The arrangement of claim 1 wherein the signal format between the switch and the wireless base station is the ISDN BRI signal format.

13. The arrangement of claim 1 wherein the signal format between the switch and the wireless base station is the ISDN PRI signal format.

14. The arrangement of claim 1 wherein the signal format between the switch and the wireless base station is the ISDN 2B+D signal format, where D is the packet switched channel and each of the B channels is a circuit switched channel.

15. The arrangement of claim 1 wherein the packet switched channel communicates through the wireless base station with a plurality of wireless terminals.

16. The arrangement of claim 2 where the packet switched channel communicates through the base station with a plurality of wireless terminals, which plurality is greater than the number of circuit switched channels.

17. The switch arrangement of claim 1 wherein:
   the plurality of ports of the switch are digital ports and the switch provides communication features usable by digital wired terminals; and
   the wireless base station employs a digital communications protocol for interaction with the switch and uses only said features usable by the digital wired terminals in its interactions with the switch.

18. The switch arrangement of claim 17 wherein:
   the wireless base station uses a terminal registration feature of the switch for tracking the wireless terminals.

19. The switch arrangement of claim 17 wherein:
   the wireless base station uses at least one of a conference, a call transfer, and a bridging feature of the switch for handing-off wireless calls between the wireless terminals.

20. The switch arrangement of claim 1 wherein:
   the wireless base station is connected to said one of said ports by a passive bus.

21. The switch arrangement of claim 20 wherein:
   the passive bus comprises an ISDN link.

22. A wireless base station for connection to a port of a switch that includes a plurality of the ports and means for coupling signals between a pair of said ports, each of the ports including at least one circuit switched information channel and at least one packet switched channel, and wherein the switch provides communications features usable by wired terminals to any terminals that are connected to said ports, the wireless base station comprising:
   means for connecting the wireless base station to one of said ports; and
   means, connected to the one of said ports by said connecting means, for interacting with the switch on behalf of the wireless base station and using only said features usable by wired terminals in its interactions with the switch to enable the wireless base station to provide wireless communications to wireless terminals.

23. The wireless base station of claim 22 for connection to a digital port of the switch, wherein the switch provides communication features usable by digital wired terminals, wherein:
   the means for interacting employs a digital communications protocol for interacting with the switch and uses only said features usable by the digital wired terminals in its interactions with the switch.

24. The wireless base station of claim 23 wherein:

the means for interacting use a terminal registration feature of the switch for tracking the wireless terminals.

25. The wireless base station of claim 23 wherein:

the means for interacting use at least one of a conference, a call transfer, and a bridging feature of the switch for handing-off wireless calls between the wireless terminals.

26. The wireless base station of claim 22 wherein:

the connecting means connect the wireless base station to one of said ports via a passive bus.

27. The wireless base station of claim 26 wherein:

the passive bus comprises an ISDN link.

* * * * *